US010221070B2

(12) United States Patent
Honjo et al.

(10) Patent No.: US 10,221,070 B2
(45) Date of Patent: Mar. 5, 2019

(54) COAL UPGRADE PLANT AND METHOD FOR MANUFACTURING UPGRADED COAL

(71) Applicant: MITSUBISHI HEAVY INDUSTRIES, LTD., Tokyo (JP)

(72) Inventors: Shintaro Honjo, New York, NY (US); Kiyotaka Kunimune, New York, NY (US); Motofumi Ito, New York, NY (US); Junji Asahara, New York, NY (US)

(73) Assignee: MITSUBISHI HEAVY INDUSTRIES ENGINEERING, LTD., Yokohama-shi (JP)

( * ) Notice: Subject to any disclaimer, the term of this patent is extended or adjusted under 35 U.S.C. 154(b) by 107 days.

(21) Appl. No.: 14/641,668

(22) Filed: Mar. 9, 2015

(65) Prior Publication Data
US 2016/0264423 A1    Sep. 15, 2016

(51) Int. Cl.
| C10L 5/00 | (2006.01) |
| C01B 32/30 | (2017.01) |
| C10L 5/04 | (2006.01) |
| C10L 5/10 | (2006.01) |
| C10B 53/04 | (2006.01) |
| C10B 57/00 | (2006.01) |
| C10B 57/10 | (2006.01) |

(52) U.S. Cl.
CPC .............. *C01B 32/30* (2017.08); *C10B 53/04* (2013.01); *C10B 57/005* (2013.01); *C10B 57/10* (2013.01); *C10L 5/04* (2013.01); *C10L 5/10* (2013.01)

(58) Field of Classification Search
CPC . C10L 9/08; C01B 31/08; C01B 53/00; C01B 33/003
See application file for complete search history.

(56) References Cited

U.S. PATENT DOCUMENTS

| 4,173,530 A | 11/1979 | Smith et al. |
| 4,178,150 A | 12/1979 | Flockenhaus et al. |
| 4,421,520 A | 12/1983 | Matthews |
| 4,497,637 A | 2/1985 | Purdy et al. |

(Continued)

FOREIGN PATENT DOCUMENTS

| AU | 2013/300971 A1 | 2/2015 |
| CN | 103007614 A | 4/2013 |

(Continued)

OTHER PUBLICATIONS

American Electric Power, Wet Flue Gas Desulfurization, Apr. 2005.*

(Continued)

*Primary Examiner* — Cephia D Toomer
(74) *Attorney, Agent, or Firm* — Westerman, Hattori, Daniels & Adrian, LLP

(57) ABSTRACT

A coal upgrade plant includes: a dryer 1 that dries coal; a pyrolyzer 3 that pyrolyzes the coal dried by the dryer 1; a quencher 5 that cools the coal pyrolyzed by the pyrolyzer 3; a finisher 7 that deactivates the coal cooled by the quencher 5; and cyclones 28 and 94 that collect pulverized coal generated from the coal, wherein the pulverized coal collected by the cyclones 28 and 94 is fed to an absorber fed to a scrubber 32 that treats a flue gas. Thus, the mercury generated from the coal upgrade plant can be removed.

6 Claims, 2 Drawing Sheets

(56) References Cited

U.S. PATENT DOCUMENTS

| | | | |
|---|---|---|---|
| 4,602,438 | A | 7/1986 | Draper et al. |
| 4,705,533 | A | 11/1987 | Simmons |
| 4,725,337 | A | 2/1988 | Greene |
| 4,769,042 | A | 9/1988 | Ito et al. |
| 5,322,530 | A * | 6/1994 | Merriam ................ C10L 9/00 44/608 |
| 5,423,891 | A | 6/1995 | Taylor |
| 5,711,769 | A | 1/1998 | Rinker et al. |
| 2011/0041393 | A1 | 2/2011 | Sugita et al. |
| 2014/0290130 | A1 | 10/2014 | Supandi |
| 2014/0345193 | A1 | 11/2014 | Nakagawa et al. |
| 2015/0027872 | A1 | 1/2015 | Abe et al. |
| 2015/0175890 | A1* | 6/2015 | Nakagawa ............ C10B 57/005 202/136 |
| 2015/0329793 | A1 | 11/2015 | Kaneko et al. |
| 2016/0115100 | A1 | 4/2016 | Glover et al. |

FOREIGN PATENT DOCUMENTS

| | | |
|---|---|---|
| JP | 56-52960 B2 | 12/1981 |
| JP | 61-250098 A | 11/1986 |
| JP | 62-114033 U | 7/1987 |
| JP | 63-210192 A | 8/1988 |
| JP | 9-71791 A | 3/1997 |
| JP | 2005-105029 A | 4/2005 |
| JP | 2006-96615 A | 4/2006 |
| JP | 2009-97783 A | 5/2009 |
| JP | 2012-215316 A | 11/2012 |
| JP | 2013-108700 A | 6/2013 |
| JP | 2014-031462 A | 2/2014 |
| JP | 2015-30738 A | 2/2015 |
| JP | 2015-110689 A | 6/2015 |
| WO | 2013/103097 A1 | 7/2013 |
| WO | 2013/125476 A1 | 8/2013 |
| WO | 2014/024504 A1 | 2/2014 |
| WO | 2014/091827 A1 | 6/2014 |

OTHER PUBLICATIONS

International Search Report dated Mar. 15, 2016, issued in application No. PCT/JP2016/053483, with English translation. (4 pages).
Written Opinion dated Mar. 15, 2016, issued in application No. PCT/JP2016/0653483, with English Translation (8 pages).
Internation Search Report dated May 10, 2016, issued in application No. PCT/JP2016/053486, with English translation. (4 pages).
Written Opinion dated Mar. 15, 2016, issued in application No. PCT/JP2016/053486, with English Translation. (6 pages).
International Search Report dated Mar. 15, 2016, issued in application No. PCT/JP2016/053488 with English translation. (2 pages).
Written Opinion dated Mar. 15, 2016, issued in application No. PCT/JP2016/053488, with English Translation. (6 pages).
International Search Report dated Mar. 15, 2016, issued in application No. PCT/JP2016/053482, with English translation. (4 pages).
Written Opinion dated Mar. 15, 2016, issued in application No. PCT/JP2016/053482, with English Translation. (6 pages).
International Search Report dated May 4, 2016, issued in application No. PCT/JP2016/053502, with English translation. (4 pages).
Written Opinion dated May 4, 2016, issued in application No. PCT/JP2016/053502, with English Translation. (8 pages).
Non-Final Office Action dated Jun. 30, 2016, issued in U.S. Appl. No. 14/641,780 (7 pages).
Non-Final Office Action dated Dec. 9, 2016, issued in U.S. Appl. No. 14/641,801, (21 pages).
Final Office Action dated Dec. 30, 2016, issued in U.S. Appl. No. 14/641,780 (11 pages).
Non-Final Office Action dated Jan. 17, 2017, issued in U.S. Appl. No. 14/641,788 (24 pages).
Final Office Action dated Dec. 13, 2017, issued in U.S. Appl. No. 14/641,684 (12 pages).
Final Office Action dated Nov. 15, 2017, issued in U.S. Appl. No. 14/641,780 (11 pages).
Office Action dated Nov. 23, 2017, issued in Australian Application No. 2016230473. (5 pages).
Non-Final Office Action dated Apr. 19, 2018, issued in U.S. Appl. No. 14/641,788 (11 pages).
Office Action dated Jul. 10, 2018, issued in Japanese Application No. 2017-504916, with English machine translation. (4 pages).
Non-Final Office Action dated Jun. 16, 2017, issued in related U.S. Appl. No. 14/641,780 (13 pages).
Final Office Action dated May 11, 2017, issued in related U.S. Appl. No. 14/641,801 (15 pages).
Non-Final Office Action dated Jul. 19, 2017, issued in related U.S. Appl. No. 14/641,684 (24 pages).
Final Office Action dated Jul. 27, 2017, issued in related U.S. Appl. No. 14/641,788 (11 pages).

* cited by examiner

COAL UPGRADE PLANT AND METHOD FOR MANUFACTURING UPGRADED COAL

BACKGROUND OF THE INVENTION

1. Field of the Invention

The present invention relates to a coal upgrade plant and a method for manufacturing upgraded coal.

2. Description of Related Art

Since low ranking coal such as sub-bituminous coal and lignite has a lower carbonization degree and a higher water content than high ranking coal, a calorific value per unit weight is lower. However, since there are abundant deposits of low ranking coal, the low ranking coal is desired to be effectively used. Thus, various coal upgrading techniques have been studied in which the calorific value of the low ranking coal is increased by performing pyrolysis after drying the low ranking coal, and upgraded coal is deactivated so as to prevent spontaneous combustion during transportation or storage (e.g., Japanese Unexamined Patent Application, Publication No. 2014-31462 (hereinafter referred to as JPA 2014-31462)).

JPA 2014-31462 discloses that pulverized coal is fed into a pyrolysis furnace, and mercury-based substances (HgS, $HgCl_2$ or the like) contained in a pyrolysis gas generated when coal is pyrolyzed are adsorbed to the pulverized coal and discharged outside of a system in order to prevent an increase in the concentration of mercury in pyrolyzed coal with the mercury-based substances being re-adsorbed to the pyrolyzed coal. The pulverized coal adsorbing the mercury-based substances is incinerated in a combustor to produce a combustion gas. The combustion gas is released to the atmosphere through a denitration apparatus, an electric dust collector, and a desulfurization apparatus after heating a pyrolyzer. While the mercury-based substances generated in the pyrolysis furnace are incinerated in the combustor together with the pulverized coal adsorbing the mercury-based substances as described above, only the pulverized coal is incinerated, and the mercury remains as a gas in the combustion gas. Thus, the remaining gaseous mercury is removed in the denitration apparatus and the desulfurization apparatus.

However, even when the mercury existing in a gaseous state in the combustion gas is removed in the denitration apparatus and the desulfurization apparatus, the mercury may not be removed to a desired concentration or less.

The present invention has been made in view of such circumstances, and an object thereof is to provide a coal upgrade plant and a method for manufacturing upgraded coal capable of removing mercury generated from the coal upgrade plant.

BRIEF SUMMARY OF THE INVENTION

To achieve the above object, a coal upgrade plant and a method for manufacturing upgraded coal of the present invention employ the following solutions.

A coal upgrade plant according to one aspect of the present invention includes: a dryer that dries coal; a pyrolyzer that pyrolyzes the coal dried by the dryer; a quencher that cools the coal pyrolyzed by the pyrolyzer; a finisher that deactivates the coal cooled by the quencher; and a pulverized coal collecting device (apparatus/equipment) that collects pulverized coal generated from the coal, wherein the pulverized coal collected by the pulverized coal collecting device is fed to a flue gas discharged from at least one of the dryer, the pyrolyzer, the quencher, and the finisher, and/or an absorber fed to a scrubber that treats the flue gas, and/or waste water produced by treating the flue gas.

The pulverized coal is generated from the coal while the coal is being treated in the coal upgrade plant. The pulverized coal is collected in the pulverized coal collecting device, and fed to the flue gas discharged from at least one of the dryer, the pyrolyzer, the quencher, and the finisher, and/or the absorber fed to the scrubber that treats the flue gas, and/or the waste water produced by treating the flue gas. The pulverized coal has a particle size of, for example, about 100 μm or less, has a large specific surface area, and can be used as activated coal. Thus, when the pulverized coal is mixed into the gas or the absorber, the pulverized coal can adsorb and immobilize mercury. Since the mercury is adsorbed to the pulverized coal and immobilized as described above, it is possible to easily remove the mercury together with the pulverized coal.

The coal upgrade plant according to one aspect of the present invention further includes a scrubber that treats a carrier gas as the flue gas discharged from the dryer while catching a desorbed component desorbed from the coal when the coal is dried by the dryer, wherein the pulverized coal collected by the pulverized coal collecting device is fed to an absorber fed to the scrubber.

When the pulverized coal is mixed into the absorber of the scrubber, the pulverized coal can adsorb and immobilize the mercury in the absorber.

The coal upgrade plant according to one aspect of the present invention further includes: a combustor that combusts a pyrolysis gas discharged from the pyrolyzer; and a flue gas treatment device that treats a combustion gas generated from the combustor, wherein the pulverized coal collected by the pulverized coal collecting device is fed to the combustion gas as the flue gas discharged from the combustor.

When the pulverized coal is mixed into the flue gas discharged from the combustor, the pulverized coal can adsorb and immobilize the mercury in the gas.

In the coal upgrade plant according to one aspect of the present invention, the pulverized coal collecting device collects the pulverized coal from the carrier gas discharged from the dryer.

The pulverized coal can be collected from the carrier gas discharged from the dryer. A cyclone using a centrifugal force is preferably used as a dust collector that collects the pulverized coal.

In the coal upgrade plant according to one aspect of the present invention, a deactivation gas for deactivating the coal by reacting with the coal is guided to the finisher, and the pulverized coal collecting device collects the pulverized coal from the deactivation gas discharged from the finisher.

The pulverized coal can be collected from the deactivation gas discharged from the finisher. A cyclone using a centrifugal force is preferably used as a dust collector that collects the pulverized coal.

In the coal upgrade plant according to one aspect of the present invention, the flue gas treatment device is a bag filter.

Since the pulverized coal is fed to the combustion gas and the mercury is adsorbed to the pulverized coal, the mercury can be easily removed by the bag filter. Accordingly, it becomes unnecessary to install a denitration apparatus and a desulfurization apparatus so as to remove the mercury existing in a gaseous state, and the costs can be reduced.

A method for manufacturing upgraded coal according to one aspect of the present invention includes: a drying step of drying coal; a pyrolyzing step of pyrolyzing the coal dried in the drying step; a cooling step of cooling the coal pyrolyzed in the pyrolyzing step; a deactivating step of deactivating the coal cooled in the cooling step; and a pulverized coal collecting step of collecting pulverized coal generated from the coal, wherein the pulverized coal collected in the pulverized coal collecting step is fed to a flue gas discharged in at least one of the drying step, the pyrolyzing step, the cooling step, and the deactivating step, and/or an absorber fed to a scrubber that treats the flue gas, and/or waste water produced by treating the flue gas.

The pulverized coal is generated from the coal while the coal is being treated in the coal upgrade plant. The pulverized coal is collected in the pulverized coal collecting step, and fed to the flue gas discharged in at least one of the drying step, the pyrolyzing step, the cooling step, and the deactivating step, and/or the absorber fed to the scrubber that treats the flue gas, and/or the waste water produced by treating the flue gas. The pulverized coal has a particle size of, for example, about 100 μm or less, has a large specific surface area, and can be used as activated coal. Thus, when the pulverized coal is mixed into the gas or the absorber, the pulverized coal can adsorb and immobilize mercury. Since the mercury is adsorbed to the pulverized coal and immobilized as described above, it is possible to easily remove the mercury together with the pulverized coal.

According to the present invention, the mercury generated from the coal upgrade plant can be removed by adsorbing the mercury to the pulverized coal.

DETAILED DESCRIPTION OF THE INVENTION

In the following, one embodiment according to the present invention is described by reference to the drawings.

Figure 1:
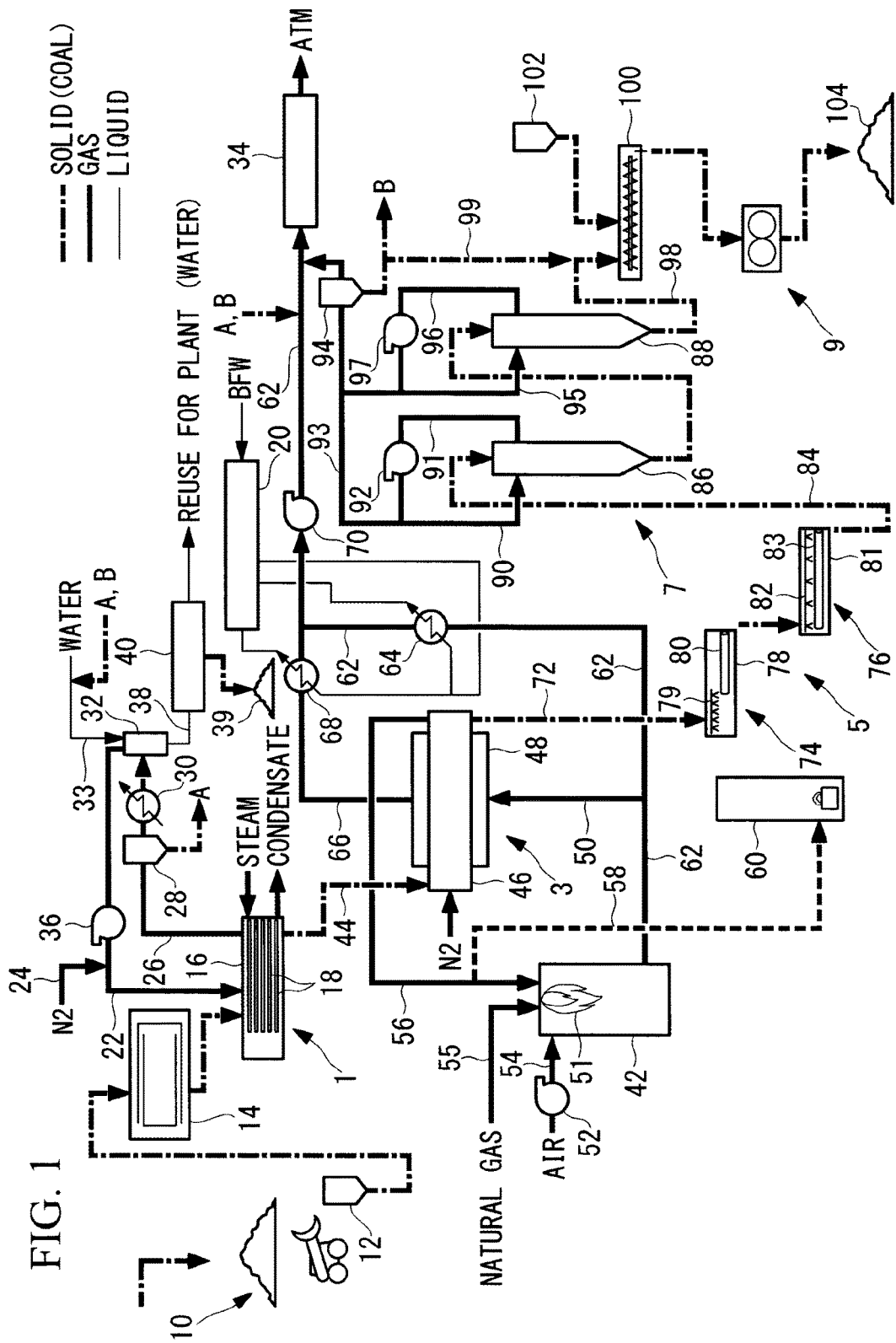
FIG. 1 is a schematic configuration diagram illustrating the entire configuration of a coal upgrade plant according to one embodiment of the present invention.

FIG. 1 shows a coal upgrade plant according to one embodiment of the present invention. The coal upgrade plant includes a dryer 1 that heats and dries coal, a pyrolyzer 3 that heats and pyrolyzes the dried coal dried in the dryer 1, a quencher 5 that cools the pyrolyzed coal pyrolyzed in the pyrolyzer 3, a finisher 7 that deactivates the pyrolyzed coal cooled in the quencher 5, and a briquetter 9 that briquettes the upgraded coal deactivated by the finisher 7 into a predetermined shape.

A coal hopper 12 that receives raw coal 10 is provided on the upstream side of the dryer 1. The raw coal is low ranking coal such as sub-bituminous coal and lignite, and has a water content of 25 wt % or more to 60 wt % or less. The coal guided from the coal hopper 12 is crushed to a particle size of, for example, about 20 mm or less in a crusher 14.

The coal crushed in the crusher 14 is guided to the dryer 1. The dryer 1 is of indirect heating type using steam, and includes a cylindrical vessel 16 that rotates about a center axis, and a plurality of heating tubes 18 that are inserted into the cylindrical vessel 16. The coal guided from the crusher 14 is fed into the cylindrical vessel 16. The coal fed into the cylindrical vessel 16 is guided from one end side (the left side in FIG. 1) to the other end side while being agitated according to the rotation of the cylindrical vessel 16. Steam having a temperature of 150° C. or more to 200° C. or less (more specifically, 180° C.), which is produced in a steam system 20, is fed into each of the heating tubes 18, thereby indirectly heating the coal in contact with the outer periphery of each of the heating tubes 18. The steam fed into each of the heating tubes 18 is condensed after applying condensation heat by heating the coal, discharged from the dryer 1, and returned to the steam system 20.

A carrier gas is fed into the cylindrical vessel 16 through a carrier gas circulation path 22. As the carrier gas, an inert gas is used. More specifically, a nitrogen gas is used. When in shortage, the nitrogen gas is additionally fed from a nitrogen feed path 24 that is connected to the carrier gas circulation path 22. The carrier gas is discharged outside of the cylindrical vessel 16 through a carrier gas discharge path 26 that is connected to the cylindrical vessel 16 while catching a desorbed component (steam, pulverized coal, mercury, mercury-based substances, etc.) desorbed from the coal when passing through the cylindrical vessel 16.

A cyclone (pulverized coal collecting device) 28, a carrier gas cooler 30, and a scrubber 32 are provided in the carrier gas discharge path 26 sequentially from the upstream side of a carrier gas flow direction.

The cyclone 28 mainly removes the pulverized coal (for example, having a particle size of 100 μm or less) that is a solid from the carrier gas by use of a centrifugal force. The pulverized coal (see reference character A) removed in the cyclone 28 is guided to an absorber feed path 33 of the scrubber 32, and a combustion gas discharge path 62 on the upstream side of a bag filter (flue gas treatment device) 34 as indicated by reference characters A and B. The pulverized coal separated in the cyclone 28 may be also mixed into the dried coal dried in the dryer 1.

The carrier gas cooler 30 cools the carrier gas, from which the pulverized coal has been removed, thereby condensing steam guided together with the carrier gas and removing the condensed steam as drain water. The carrier gas cooler 30 is an indirect heat exchanger. Industrial water having a normal temperature is used as a cooling medium. Recycled water separated in a waste water treatment equipment 40 may be also used as the cooling medium. The drain water produced in the carrier gas cooler 30 is guided to a liquid phase section in a lower portion of the scrubber 32.

The scrubber 32 removes the mercury and/or the mercury-based substances (simply referred to as "mercury etc." below) from the carrier gas, from which the pulverized coal and the steam have been removed. An absorber is fed to the scrubber 32 from the absorber feed path 33. Water is used as the absorber used in the scrubber 32. More specifically, the recycled water separated in the waste water treatment equipment 40 is used. The pulverized coal collected in the cyclone 28 of the dryer 1 and a cyclone 94 of the finisher 7 is fed to the absorber feed path 33. The pulverized coal is thereby mixed into the water atomized from the scrubber 32. The mercury etc. in the carrier gas is adsorbed by the water sprayed from above the scrubber 32, and guided to the liquid phase section in the lower portion of the scrubber 32. Since the pulverized coal is contained in the water as the absorber, the mercury introduced into the water is adsorbed to the pulverized coal and immobilized. In the scrubber 32, the pulverized coal that could not be removed in the cyclone 28 is also removed.

An upstream end of the carrier gas circulation path 22 is connected to an upper portion of the scrubber 32. A blower 36 is provided at an intermediate position of the carrier gas circulation path 22. The carrier gas treated in the scrubber 32 is returned to the dryer 1 by the blower 36. Although not shown in the drawings, one portion of the carrier gas treated in the scrubber 32 is guided to a combustor 42.

The waste water treatment equipment 40 is connected to the lower portion of the scrubber 32 through a waste water path 38. The waste water treatment equipment 40 separates sludge 39, which is a solid content such as the pulverized coal and the mercury etc., and the recycled water by a sedimentation tank (not shown) after aggregating and enlarging the mercury etc. by injecting a chelating agent into waste water. The recycled water is reused in various portions of the plant.

The coal (dried coal) dried in the dryer 1 passes through a dried coal feed path 44 to be guided to the pyrolyzer 3 by use of its weight. The pyrolyzer 3 is an external-heat rotary kiln, and includes a rotating inner cylinder 46, and an outer cylinder 48 that covers the outer peripheral side of the rotating inner cylinder 46. A nitrogen gas as a carrier gas is fed into the rotating inner cylinder 46.

A combustion gas produced in the combustor 42 is guided to a space between the rotating inner cylinder 46 and the outer cylinder 48 through a combustion gas introduction path 50. Accordingly, the inside of the rotating inner cylinder 46 is maintained at 350° C. or more to 450° C. or less (for example, 400° C.)

To the combustor 42, an air feed path 54 that guides combustion air force-fed by a blower 52 into the combustor, a natural gas feed path 55 that guides a natural gas as fuel into the combustor, and a pyrolysis gas collection path 56 that collects a pyrolysis gas generated in the pyrolyzer 3 together with the carrier gas, and guides the gas into the combustor are connected. In the combustor 42, a fire 51 is formed by the natural gas, the pyrolysis gas, and the air fed into the combustor. Since the pyrolysis gas contains a volatile content such as tar and has a predetermined calorific value, the pyrolysis gas is used as fuel in the combustor 42. The natural gas fed from the natural gas feed path 55 is used for adjusting a calorific value of the fuel injected into the combustor 42. A flow rate of the natural gas is adjusted such that the combustion gas produced in the combustor 42 has a desired temperature.

A pyrolysis gas discharge path 58 that is used in emergency is connected to an intermediate position of the pyrolysis gas collection path 56. A flare stack 60 is installed on the downstream side of the pyrolysis gas discharge path 58. A combustible component such as tar in the pyrolysis gas is incinerated by the flare stack 60, and a gas obtained after the incineration is released to the atmosphere.

A combustion gas discharge path 62 through which the combustion gas produced in the combustor is discharged is connected to the combustor 42. An upstream end of the combustion gas introduction path 50 that guides the combustion gas to the pyrolyzer 3 is connected to an intermediate position of the combustion gas discharge path 62. A first medium-pressure boiler 64 is provided in the combustion gas discharge path 62 on the downstream side of a connection position with the combustion gas introduction path 50.

An after-heating gas discharge path 66 through which the combustion gas after heating the rotating inner cylinder 46 is discharged is connected to the outer cylinder 48 of the pyrolyzer 3. A second medium-pressure boiler 68 is provided in the after-heating gas discharge path 66. The after-heating gas discharge path 66 is connected to the combustion gas discharge path 62 on the downstream side. A blower 70 that force-feeds the combustion gas is provided in the combustion gas discharge path 62 on the downstream side of a connection position with the after-heating gas discharge path 66.

The downstream side of the combustion gas discharge path 62 is connected to the bag filter 34. The pulverized coal collected in the cyclone 28 of the dryer 1 and the cyclone 94 of the finisher 7 is fed to the upstream side of the bag filter 34 as indicated by the reference characters A and B. The pulverized coal is thereby mixed into the combustion gas (flue gas) flowing through the combustion gas discharge path 62. The mercury existing in a gaseous state in the combustion gas is adsorbed to the pulverized coal in the combustion gas and immobilized. The pulverized coal adsorbing the mercury, combustion ash or the like are removed by the bag filter 34. The combustion gas passing through the bag filter 34 is released to the atmosphere (ATM).

The steam system 20 includes the first medium-pressure boiler 64 and the second medium-pressure boiler 68. In the second medium-pressure boiler 68, boiler feed water (BFW) fed thereto is heated by the combustion gas flowing through the after-heating gas discharge path 66, thereby producing steam. In the first medium-pressure boiler 64, the steam produced in the second medium-pressure boiler 68 is guided, and heated by the flue gas flowing through the combustion gas discharge path 62, thereby producing steam having a higher pressure. Medium-pressure steam produced in the first medium-pressure boiler 64 and medium-pressure steam produced in the second medium-pressure boiler 68 are respectively stored in a steam drum (not shown), and fed to various portions of the plant such as the heating tubes 18 of the dryer 1.

The pyrolyzed coal pyrolyzed in the pyrolyzer 3 is guided to the quencher 5 through a pyrolyzed coal feed path 72 by use of gravity. The quencher 5 includes a first cooler 74 that receives the pyrolyzed coal from the pyrolyzer 3, and a second cooler 76 that receives the pyrolyzed coal cooled by the first cooler 74.

The first cooler 74 is a shell-and-tube heat exchanger, and includes a first cylindrical vessel 78 that rotates about a center axis, a first water spray tube 79 that is inserted into the first cylindrical vessel 78, and a plurality of first cooling tubes 80 that are inserted into the first cylindrical vessel 78. The first water spray tube 79 is installed in a stationary state with respect to the rotating first cylindrical vessel 78. The pyrolyzed coal having a temperature of 300° C. or more to 500° C. or less (for example, about 400° C.), which is guided from the pyrolyzer 3, is fed into the first cylindrical vessel 78. The pyrolyzed coal fed into the first cylindrical vessel 78 is guided from one end side (the left side in FIG. 1) to the other end side while being agitated according to the rotation of the first cylindrical vessel 78.

Industrial water having a normal temperature is guided to the first water spray tube 79. The water is sprayed on the pyrolyzed coal and thereby brought into direct contact with the pyrolyzed coal to cool down the pyrolyzed coal. The first water spray tube 79 is provided on the upstream side (the left side in FIG. 1) of the pyrolyzed coal moving within the first cylindrical vessel 78. The recycled water separated in the waste water treatment equipment 40 may be used as the water fed to the first water spray tube 79.

Boiler feed water having a temperature of 50° C. or more to 100° C. or less (for example, about 60° C.) is fed into each of the first cooling tubes 80, thereby indirectly cooling the pyrolyzed coal in contact with the outer periphery of each of the first cooling tubes 80. Each of the first cooling tubes 80 is provided on the downstream side (the right side in FIG. 1)

of the pyrolyzed coal moving within the first cylindrical vessel 78. Each of the first cooling tubes 80 cools the pyrolyzed coal cooled by the first water spray tube 79 to about 150° C. that is equal to or higher than a condensation temperature of water.

The second cooler 76 has substantially the same configuration as the first cooler 74. The second cooler 76 is a shell-and-tube heat exchanger, and includes a second cylindrical vessel 81 that rotates about a center axis, a second water spray tube 82 that is inserted into the second cylindrical vessel 81, and a plurality of second cooling tubes 83 that are inserted into the second cylindrical vessel 81. The second water spray tube 82 is installed in a stationary state with respect to the rotating second cylindrical vessel 81. The pyrolyzed coal cooled to about 150° C. in the first cooler 74 is fed into the second cylindrical vessel 81. The pyrolyzed coal fed into the second cylindrical vessel 81 is guided from one end side (the left side in FIG. 1) to the other end side while being agitated according to the rotation of the second cylindrical vessel 81.

Industrial water having a normal temperature is guided to the second water spray tube 82. The water is sprayed on the pyrolyzed coal to adjust the water content of the pyrolyzed coal to a desired value (for example, 8 wt %). The second water spray tube 82 is provided over substantially the entire second cylindrical vessel 81 in an axial direction. The recycled water separated in the waste water treatment equipment 40 may be used as the water fed to the second water spray tube 82.

Industrial water having a normal temperature is guided into each of the second cooling tubes 83, thereby indirectly cooling the pyrolyzed coal in contact with the outer periphery of each of the second cooling tubes 83. Each of the second cooling tubes 83 cools the pyrolyzed coal to about 50° C. The recycled water separated in the waste water treatment equipment 40 may be used as the water fed to each of the second cooling tubes 83.

The pyrolyzed coal cooled in the quencher 5 is guided to the finisher 7 through a cooled pyrolyzed coal feed path 84.

The finisher 7 includes a first deactivator 86 that receives the pyrolyzed coal cooled in the quencher 5, and a second deactivator 88 that receives the pyrolyzed coal from the first deactivator 86.

An oxidation gas having an oxygen concentration of about 0.5 to 3.0% is guided into the first deactivator 86 from a first oxidation gas feed path 90. Although not shown in the drawings, oxygen (more specifically, air) is fed to the first oxidation gas feed path 90 so as to adjust the oxygen concentration to a desired value.

The oxidation gas fed into the first deactivator 86 oxidizes an active spot (radical) generated by the pyrolysis to deactivate the pyrolyzed coal within the first deactivator 86. The oxidation gas discharged from the first deactivator 86 is guided to a first blower 92 through a first oxidation gas outlet tube 91 together with the pulverized coal. The oxidation gas force-fed by the first blower 92 is guided to the first oxidation gas feed path 90 again, and recirculated. The oxidation gas guided not to the first oxidation gas feed path 90, but to an oxidation gas discharge tube 93 is guided to a cyclone 94. The solid content such as the pulverized coal is separated from the oxidation gas guided to the cyclone (pulverized coal collecting device) 94 in the cyclone 94, and the resultant gas is guided to the bag filter 34 and released to the atmosphere (ATM). The pulverized coal removed in the cyclone 94 (see reference character B) is guided to the absorber feed path 33 of the scrubber 32, and the combustion gas discharge path 62 on the upstream side of the bag filter 34 as indicated by the reference characters A and B. The remaining solid content such as the pulverized coal separated in the cyclone 94 is fed to a kneader 100.

The pyrolyzed coal is injected from an upper portion of the first deactivator 86, and deactivated in contact with the oxidation gas while descending. The pyrolyzed coal retained in a lower portion of the first deactivator 86 is taken out from the lower portion, and guided to an upper portion of the second deactivator 88.

An oxidation gas having an oxygen concentration of about 8.0 to 12.0% is guided into the second deactivator 88 from a second oxidation gas feed path 95. Although not shown in the drawings, oxygen (more specifically, air) is fed to the second oxidation gas feed path 95 so as to adjust the oxygen concentration to a desired value.

The oxidation gas fed into the second deactivator 88 further deactivates the pyrolyzed coal deactivated in the first deactivator 86. The oxidation gas discharged from the second deactivator 88 is guided to a second blower 97 through a second oxidation gas outlet tube 96 together with the pulverized coal. The oxidation gas force-fed by the second blower 97 is guided to the second oxidation gas feed path 95 again, and recirculated. The oxidation gas guided not to the second oxidation gas feed path 95, but to the oxidation gas discharge tube 93 is guided to the cyclone (pulverized coal collecting device) 94. The solid content such as the pulverized coal is separated from the oxidation gas, and the resultant gas is guided to the bag filter 34 and released to the atmosphere. As described above, the pulverized coal removed in the cyclone 94 (see the reference character B) is guided to the absorber feed path 33 of the scrubber 32, and the combustion gas discharge path 62 on the upstream side of the bag filter 34 as indicated by the reference characters A and B.

The upgraded coal deactivated in the finisher 7 has a particle size of about 1 mm. The upgraded coal passes through an upgraded coal feed path 98 to be guided to the kneader 100. The pulverized coal separated in the cyclone 94 is guided to the upgraded coal feed path 98 through a pulverized coal collection path 99.

A binder guided from a binder feed section 102, the upgraded coal including the pulverized coal, and water are fed to and kneaded in the kneader 100. Examples of the binder include polyethylene oxide and starch. The upgraded coal kneaded in the kneader 100 is guided to the briquetter 9.

The briquetter 9 includes a female mold where a plurality of recessed portions having a shape corresponding to the product shape of the upgraded coal are formed, and a male mold that compresses the upgraded coal fed into the recessed portions by pressing. The upgraded coal briquetted in the briquetter 9 becomes upgraded coal 104 as a product. The upgraded coal 104 has a size of about several cm, and has a water content of 6 wt % or more to 9 wt % or less. Note that the water content of the upgraded coal 104 is based on a dry weight when the water content is in equilibrium with a storage environment, and the water content largely depends on relative humidity of the storage environment, but does not much depend on the temperature. For example, PRB (powder river basin) coal has a water content of about 8 wt % when the relative humidity is 90%.

Figure 2:
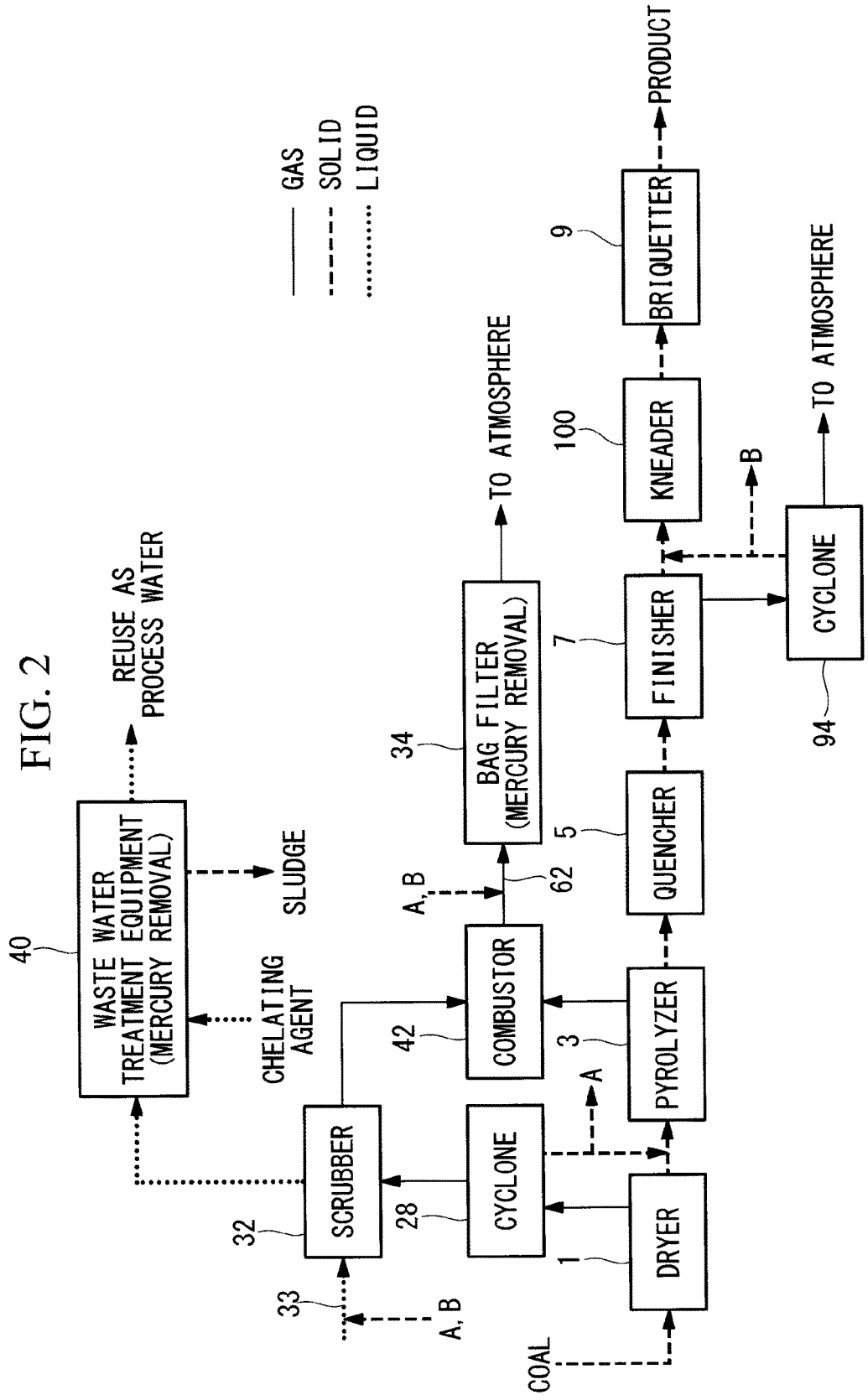
FIG. 2 is a schematic configuration diagram schematically illustrating the coal upgrade plant shown in FIG. 1.

FIG. 2 schematically shows the features of the present embodiment described above.

As shown in FIG. 2, the pulverized coal is collected in the cyclone 28 of the dryer 1 (the reference character A), and the pulverized coal is also collected in the cyclone 94 of the finisher 7 (the reference character B). The collected pulverized coal is guided to the absorber feed path 33 of the scrubber 32, and the combustion gas discharge path 62 on the upstream side of the bag filter 34.

The following effects are produced by the present embodiment.

The pulverized coal generated while the coal is being treated in the coal upgrade plant is collected in the cyclone 28 of the dryer 1 and the cyclone 94 of the finisher 7, and fed to the absorber fed to the scrubber 32, and the flue gas discharged from the combustor 42. The pulverized coal has a particle size of, for example, about 100 μm or less, has a large specific surface area, and can be used as activated coal. Thus, when the pulverized coal is mixed into the absorber of the scrubber 32, the pulverized coal can adsorb and immobilize the mercury in the absorber. When the pulverized coal is mixed into the flue gas discharged from the combustor 42, the pulverized coal can adsorb and immobilize the mercury in the gas. Since the mercury is adsorbed to the pulverized coal and immobilized as described above, it is possible to easily remove the mercury together with the pulverized coal.

Since the pulverized coal is fed to the combustion gas flowing through the combustion gas discharge path 62, and the gaseous mercury is adsorbed to the pulverized coal, the mercury can be easily removed by the bag filter 34. Accordingly, it becomes unnecessary to install a denitration apparatus and a desulfurization apparatus so as to remove the mercury existing in a gaseous state, and the costs can be reduced.

Although the cyclone 28 of the dryer 1 and the cyclone 94 of the finisher 7 are described as an example of the pulverized coal collecting device that collects the pulverized coal in the aforementioned embodiment, only one of the cyclone 28 and the cyclone 94 may be used as the pulverized coal collecting device.

Also, the pulverized coal collecting device may be provided at any position in the coal upgrade plant as long as the pulverized coal can be collected. For example, the pulverized coal collecting device may be configured to collect the pulverized coal from a carrier gas discharged from the quencher 5, or may be configured to collect the pulverized coal from the dried coal feed path 44 through which the dried coal is fed to the pyrolyzer 3 from the dryer 1.

Although the pulverized coal is fed to the absorber of the scrubber 32 and the combustion gas on the upstream side of the bag filter 34, the present invention is not limited thereto. The pulverized coal can be fed to any flue gas or any waste water containing the mercury. For example, the pulverized coal may be fed to waste water collected from the scrubber 32. Also, when another scrubber is installed in addition to the scrubber 32 of the dryer 1, the pulverized coal may be mixed into an absorber of the scrubber.

1 Dryer
3 Pyrolyzer
5 Quencher
7 Finisher
9 Briquetter
10 Raw coal
12 Coal hopper
14 Crusher
16 Cylindrical vessel
18 Heating tube
20 Steam system
22 Carrier gas circulation path
28 Cyclone
30 Carrier gas cooler
32 Scrubber (pulverized coal collecting device)
33 Absorber feed path
34 Bag filter (flue gas treatment device)
40 Waste water treatment equipment
42 Combustor
46 Rotating inner cylinder
48 Outer cylinder
50 Combustion gas introduction path
74 First cooler
76 Second cooler
78 First cylindrical vessel
79 First water spray tube
80 First cooling tube
81 Second cylindrical vessel
82 Second water spray tube
83 Second cooling tube
86 First deactivator
88 Second deactivator
94 Cyclone (pulverized coal collecting device)
100 Kneader
104 Upgraded coal

What is claimed is:

1. A coal upgrade plant comprising:
   a dryer configured to dry coal;
   a pyrolyzer configured to pyrolyze the coal dried by the dryer;
   a quencher configured to cool the coal pyrolyzed by the pyrolyzer;
   a finisher configured to deactivate the coal cooled by the quencher;
   a pulverized coal collecting device configured to collect pulverized coal generated from the coal;
   an absorber feed path to which the pulverized coal collected by the pulverized coal collecting device is fed and in which the pulverized coal is mixed into an absorber; and
   a scrubber to which the absorber is fed through the absorber feed path, configured to treat a carrier gas as the flue gas discharged from the dryer while catching a desorbed component desorbed from the coal when the coal is dried by the dryer, by using the absorber into which the pulverized coal is mixed, so that at least one of mercury and mercury-based substances contained in the carrier gas is adsorbed to the pulverized coal contained in the absorber so as to remove the at least one of mercury and mercury-based substances.

2. The coal upgrade plant according to claim 1, further comprising:
   a combustor for combusting a pyrolysis gas discharged from the pyrolyzer; and
   a flue gas treatment device for treating a combustion gas generated from the combustor,
   wherein the pulverized coal collected by the pulverized coal collecting device is fed to the combustion gas as the flue gas discharged from the combustor.

3. The coal upgrade plant according to claim 1, wherein the pulverized coal collecting device collects the pulverized coal from a carrier gas discharged from the dryer.

4. The coal upgrade plant according to claim 1, wherein a deactivation gas for deactivating the coal by reacting with the coal is guided to the finisher, and
   the pulverized coal collecting device collects the pulverized coal from the deactivation gas discharged from the finisher.

5. The coal upgrade plant according to claim 2, wherein the flue gas treatment device is a bag filter.

6. A method for manufacturing upgraded coal comprising:
a drying step of drying coal;
a pyrolyzing step of pyrolyzing the coal dried in the drying step;
a cooling step of cooling the coal pyrolyzed in the pyrolyzing step;
a deactivating step of deactivating the coal cooled in the cooling step;
a pulverized coal collecting step of collecting pulverized coal generated from the coal;
a feeding step of feeding the pulverized coal collected in the pulverized coal collecting step into an absorber feed path and mixing the pulverized coal into an absorber; and
a scrubbing step of treating a carrier gas as a flue gas that is discharged in the drying step while catching a desorbed component desorbed from the coal during the drying step by using the absorber into which the pulverized coal is mixed, and adsorbing at least one of mercury and mercury-based substances contained in the carrier gas to the pulverized coal contained in the absorber so as to remove the at least one of mercury and mercury-based substances.

\* \* \* \* \*